May 2, 1933.  C. B. THORNE  1,906,664
MEANS FOR STORING, MEASURING, AND PROPORTIONING SEMIFLUENT MATERIALS
Filed Nov. 18, 1929  8 Sheets-Sheet 1

INVENTOR.
C. B. Thorne.
E. J. Fetherstonhaugh.
ATTORNEY.

May 2, 1933. C. B. THORNE 1,906,664
MEANS FOR STORING, MEASURING, AND PROPORTIONING SEMIFLUENT MATERIALS
Filed Nov. 18, 1929 8 Sheets-Sheet 3

FIG. 6

INVENTOR
C. B. Thorne
E. J. Featherstonhaugh
ATTORNEY

May 2, 1933.  C. B. THORNE  1,906,664
MEANS FOR STORING, MEASURING, AND PROPORTIONING SEMIFLUENT MATERIALS
Filed Nov. 18, 1929  8 Sheets-Sheet 4

INVENTOR.
C. B. Thorne.
E. J. Featherstonhaugh
ATTORNEY.

May 2, 1933. C. B. THORNE 1,906,664
MEANS FOR STORING, MEASURING, AND PROPORTIONING SEMIFLUENT MATERIALS
Filed Nov. 18, 1929 8 Sheets-Sheet 5

INVENTOR
C. B. Thorne
E. J. Fetherstonhaugh
ATTORNEY

May 2, 1933.  C. B. THORNE  1,906,664
MEANS FOR STORING, MEASURING, AND PROPORTIONING SEMIFLUENT MATERIALS
Filed Nov. 18, 1929   8 Sheets-Sheet 6

INVENTOR
C. B. Thorne
E. J. Featherstonhaugh
ATTORNEY

May 2, 1933. C. B. THORNE 1,906,664
MEANS FOR STORING, MEASURING, AND PROPORTIONING SEMIFLUENT MATERIALS
Filed Nov. 18, 1929 8 Sheets-Sheet 7

INVENTOR
C. B. Thorne
ATTORNEY

May 2, 1933. C. B. THORNE 1,906,664
MEANS FOR STORING, MEASURING, AND PROPORTIONING SEMIFLUENT MATERIALS
Filed Nov. 18, 1929 8 Sheets-Sheet 8

INVENTOR.
C. B. Thorne.
ATTORNEY.

Patented May 2, 1933

1,906,664

UNITED STATES PATENT OFFICE

CARL BUSCH THORNE, OF HAWKESBURY, ONTARIO, CANADA

MEANS FOR STORING, MEASURING, AND PROPORTIONING SEMIFLUENT MATERIALS

Application filed November 18, 1929. Serial No. 408,092.

The invention relates to a method and means of storing, measuring, and proportioning semi-fluent materials, and the objects of the invention are to maintain in stock varieties of material, each variety being contained in a receptacle of its own and withdrawable in predetermined quantities and if required transported to a common discharge thus mixing slowly moving materials in order that they may be used in manufactures, such as paper making, silk and other fabric producing, flour milling and many other industrial pursuits, and thereby insuring the exact proportions, as for example, in certain papers, it is desirable to mix soda pulp with sulphite pulp and also in paper and other productions it is often desirable to mix various sulphite products and in grains it has been found not only desirable, but a necessity to average the crops by mixing the different gradings, and in many other branches of industry, the best results are often obtained through the commingling of the varieties; to effect economy in the proportioning of the materials and at the same time facilitate the manufacture and increase the output of any mill or factory; to simplify the mechanism utilized in carrying out this method, and minimize as far as possible the consumption of power necessary in operating the parts; and generally to provide in mills and storage places, an efficient means of storing and operating the discharge and an effective method of utilizing varieties from storage and proportioning them to the needs of the manufacture and it consists essentially of charging a plurality of tanks, towers or other receptacles with different grades or different kinds of slowly moving materials and withdrawing them in predetermined quantities and mixing, and in affording the means to carry out this method, as more particularly described and shown hereinafter and pointed out in the claims for novelty following the description.

In the drawings.

Like numerals of reference indicate corresponding parts in the various figures.

In carrying out this method the towers, receptacles or tanks, in any number desired are charged with material which may be pulp of rather high density, grain or other products, and this materially naturally covers the bottoms of the receptacles, which are indicated by the numeral 15.

Figure 6:
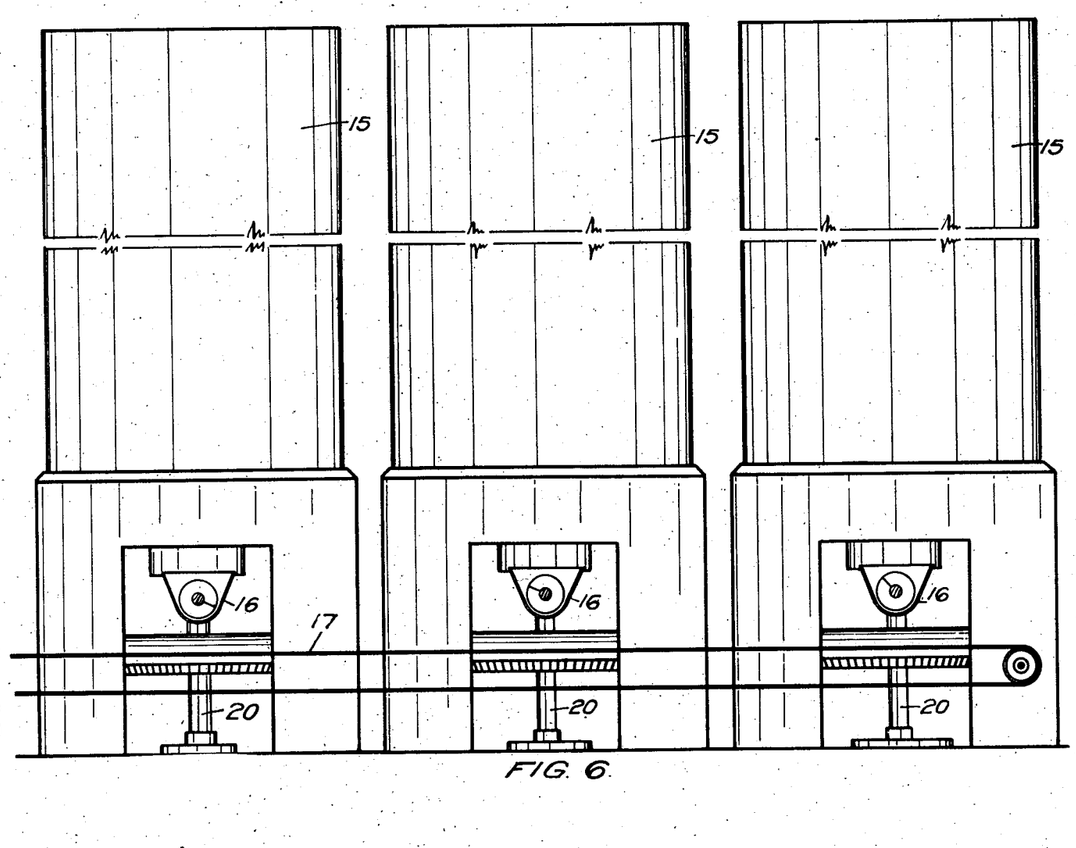
Figure 6 illustrates a battery of towers, receptacles or tanks, showing the discharges and the conveyer and illustrating broadly the scheme of this invention.

The material is withdrawn from this receptacle and discharged through any suitable outlets and in Figure 6 of the drawings these outlets are indicated by the numeral 16, which in turn empty the material to a conveyer 17.

The material from each receptacle is measured on its way out and the particular quantity from the various receptacles is determined beforehand, and the quantities dumped on the conveyer are transported to a common mixing chamber or pot and from this mixing chamber or pot the mixed materials are fed to the machines or shipped to the particular place to which they are destined.

It will be seen in making certain kinds of paper it is advisable to mix the pulp products and in order to do this successfully and with despatch, the charging as stated must first be accomplished and remain either in the way of storage or a continuous feed to the receptacles, that matters not, because with some materials and under some conditions large towers will be filled with material and gradually discharged as the material is wanted, whereas in others, the towers, tanks or receptacles whichever it may be, will only form a passage for the material to flow through, consequently the actual shape of the receptacle is not essential to the carrying out of this method, but there must be some form of measuring device within said receptacle or below it, and several forms are described in detail hereinafter and also different ways of transporting the material.

In addition to the measuring, there must also be the transport of the material to the mill or factory, or to a common mixing chamber for shipping or other purposes, which completes the carrying out of the method.

Figure 1:
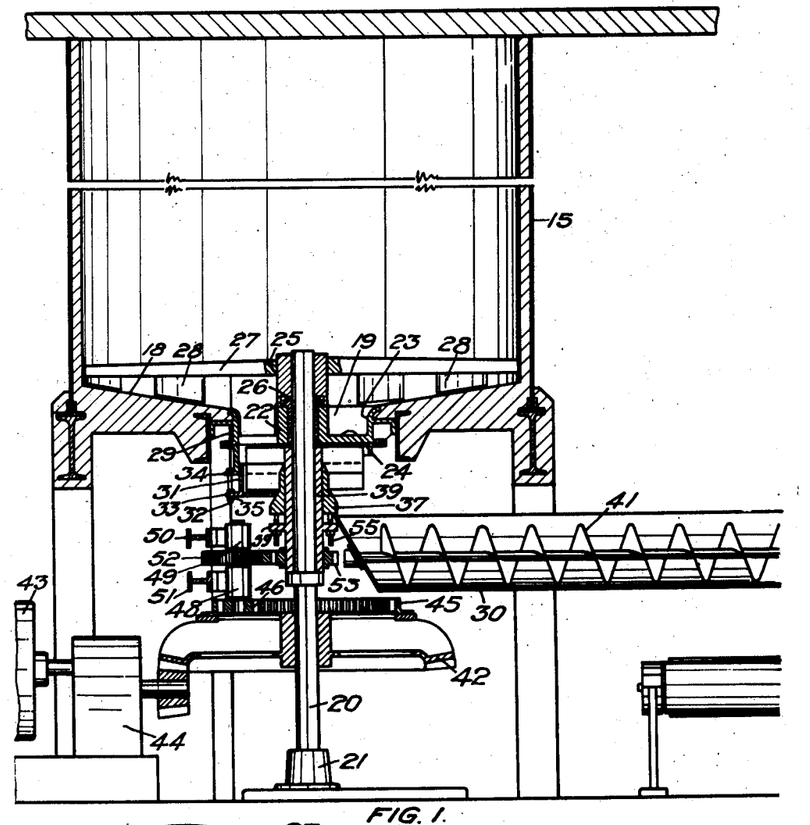
Figure 1 is a vertical sectional view of a tank or tower showing a plough member, a proportioning device and a conveyer.
Figure 2:
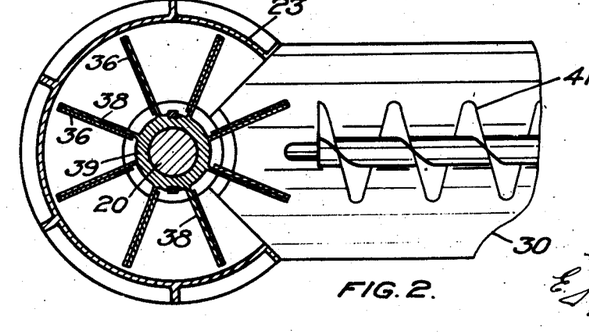
Figure 2 is a cross sectional view of the proportioning boxes showing a fragment of the screw conveyer.

In the means employed, referring particularly to Figures 1 and 2, the receptacle shown is in the form of a tower, having the bottom 18 sloping to the central opening 19, that is to say, this tower is supposed to be circular and the bottom is inclined from the wall to the circular central opening 19.

The vertical shaft 20 is journalled in the bearing 21, and extends upwardly centrally through the opening 19 and through the bearing 22 rigid with the frame 23 and the segmental plate cover 24, which are secured to the bottom 18.

The hub 25 is mounted at the upper end of the shaft 20 and bears on the bearing 22 and particularly on the balls 26 and from this hub the plough arms 27 extend to the casing or to the wall of the tower there being sufficient clearance for rotating purposes.

The plough blades 28 promote the flow of the material to the central opening 19 and keep that opening clear.

The upper section of the discharge chamber wall 29 is secured to the frame 23 and rigid therewith, and extends around on either side to the screw conveyer trough 30 to which it is secured.

The lower section 31 of the discharge chamber wall is telescopically arranged in the wall 29 and secured by the bolt 32 through the flanges 33 and 34, said bolts being adjustable by means of the nuts 35, so that the discharge chamber may be enlarged or reduced in size for measuring purposes according to the desired quantity of material that is to be emptied into the trough.

The partitions 36 extend radially from the collar 37 and terminate close to the lower wall 31 and the partitions 38 extend from the sleeve 39 and terminate short of the wall 29 and are practically the same length as the partitions 36, and these partitions 36 and 38 form the compartments or measures 40 by means of which the desired quantities of material are emptied into the trough 30, from which this material is transported by means of the screw conveyer 41.

The main driving gear 42 is fixedly mounted on the shaft 20 and this gear is driven by the motor 43 through the reduction gear connection 44.

The internal gear 45 is mounted on the gear 42 and rotates therewith and the gear 46 coacts with the gear 45. This gear 46 is fixedly mounted in the shaft 47 journalled in the bearings 48 and 49, supported from the I-beams 50 and 51, the gear 52 being mounted on the shaft 47 between said bearings 48 and 49 and coacting with the gear 53 fixedly mounted on the sleeve 39 encircling the shaft 20 and turning thereon.

The collar 37 encircles the sleeve and rotates therewith, but this collar 37 is slidable on the sleeve, and is adjustable from the flange 54 by means of the screws 55.

In the operation of this particular means of discharging and measuring, coincidently, the plough moves the material to the central opening 19.

Previous to the operation of the discharge mechanism, it has been determined just what quantity is required to be withdrawn from the receptacle or tower, and when this is finally fixed, the collar 37 is adjusted by moving it to or from the sleeve flange, therefore, the partitions 36 will be moved to and from and over the partitions 38, and when this has been done the telescopic wall 31 is pushed inwardly into proximity with the partitions 36 and bolted securely to its adjusted place.

The mechanism being now ready for operation, the large gear is set in motion and this operates the internal gear as well as the plough member, the plough member drives the material into the compartments or measures 40, and as these compartments are continuously rotating, each compartment is moved under the levelling blade and cover 24, and as soon as the particular compartment clears the segmental bottom of the discharge chamber, then the material drops out into the trough and is transported by the screw conveyor 41 to a general conveyor on to the common mixing chamber where the material from other like towers is also conveyed.

The quantity required is decided by the speed of the measuring compartments and the speed of the screw conveyor which discharges the contents of the measuring compartments on to the continuously moving belt conveyer, which also receives the discharge from the other towers.

Figure 3:
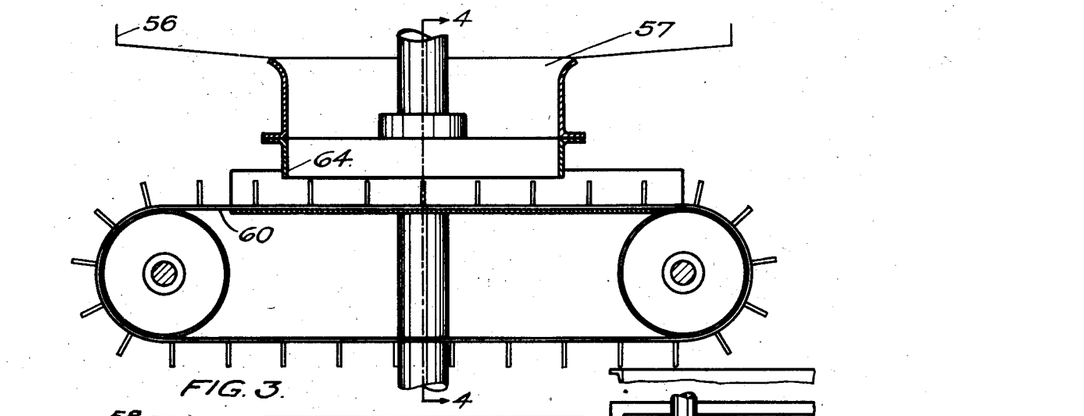
Figure 3 shows another form of proportioning discharge member and a fragmentary sectional view of the storage receptacle.
Figures 4, 5:
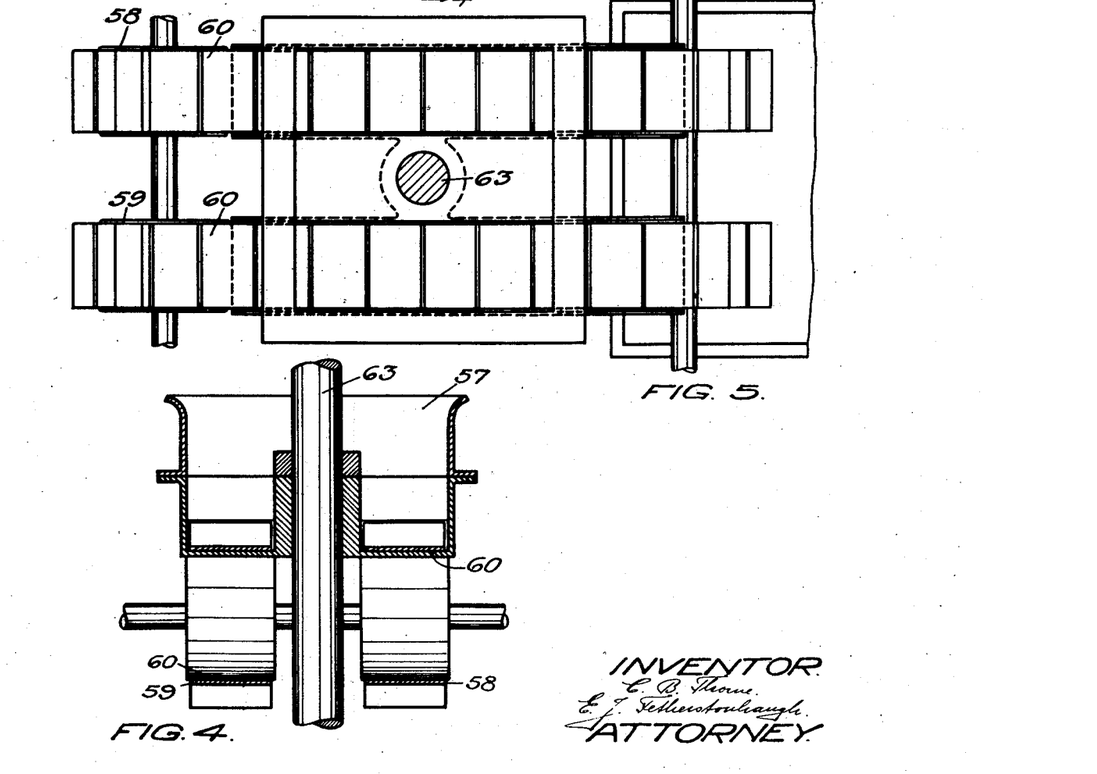
Figure 4 is an end elevational view of the conveyer and a fragmentary sectional view of the receptacle discharge.
Figure 5 is a plan view of the conveyer mechanism.

In Figures 3, 4 and 5, the tower 56 at its lower end has the trough bottom 57 through which the endless conveyers 58 and 59 operate, these conveyers being formed of the belt 60 and the transverse outstanding divisions 61 at regular intervals forming the measuring compartments 62.

The vertical shaft 63 projects upwardly to a tower and may carry a scraper or any other form of discharging device, which will assist in depositing the slowly moving material to the conveyer and into the compartments.

The measures pass the trough wall 64, and this wall levels the material in the compartment so that the exact quantity is deposited from the conveyer and the number of these measures to be filled and emptied is determined beforehand and the conveyer so operated as to obtain from this tower so many measurefuls in the proportioning of the discharge.

Figures 7, 8, 9, 10:
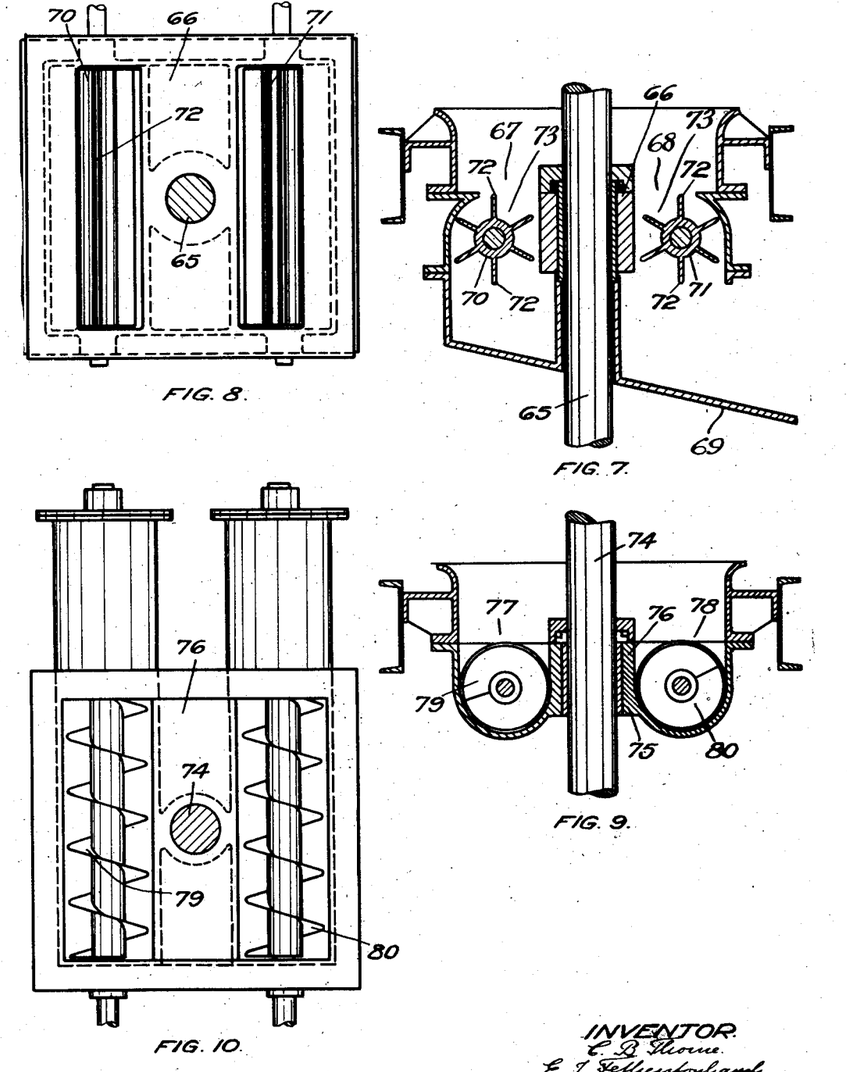
Figure 7 is a sectional view of the discharge end of a receptacle showing a modification of the measure discharge.
Figure 8 is a plan view of the mechanism illustrated in Figure 7.
Figure 9 is a sectional detail of another form of mechanism used for measuring the discharge from a receptacle.
Figure 10 is a plan view of the mechanism illustrated in Figure 9.

In Figures 7 and 8 a vertical shaft 65 extends upwardly through the base frame 66 and carries the scraper or other mechanism for discharging purposes, and this base frame forms a central dividing wall between the discharge passages 67 and 68 in said frame.

The chute 69 is secured to said frame and directs the material outwardly in its flow.

The rotors 70 and 71 have the transverse outstanding device 72 forming the measuring compartment 73 into which the material is dumped from the receptacle and it is the predetermined number of these compartments filled with the material and deposited on the chute that decides the correct proportion of the contents of the tower to be withdrawn.

In Figures 9 and 10 the vertical shaft 74 extends upwardly through the base frame 75, this base frame having the central wall 76 thereacross dividing the troughs 77 and 78.

In these troughs the screw conveyers 79 and 80 operate being suitably supported and journalled and driven.

It may be mentioned herein that the rotors 70 and 71 in Figures 7 and 8 are journalled in the base frame 66, and suitably driven.

So far as the screw conveyers 79 and 80 are concerned, the material which drops into the troughs 77 and 78 is fed by the screws and dropped outside of the base frame into any form of receptacle, and in this form of the invention it is the speed of the conveyers which determines and measures the quantity of material to be withdrawn from the tower.

Figure 11:
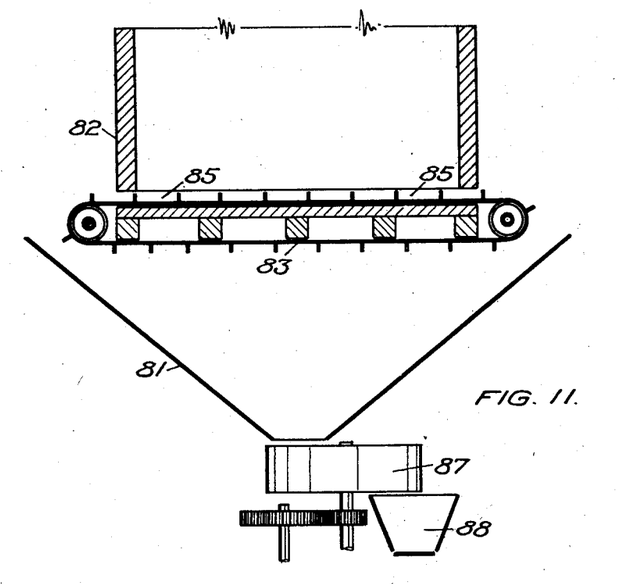
Figure 11 is still another modification of a proportioning discharge device.
Figure 12:
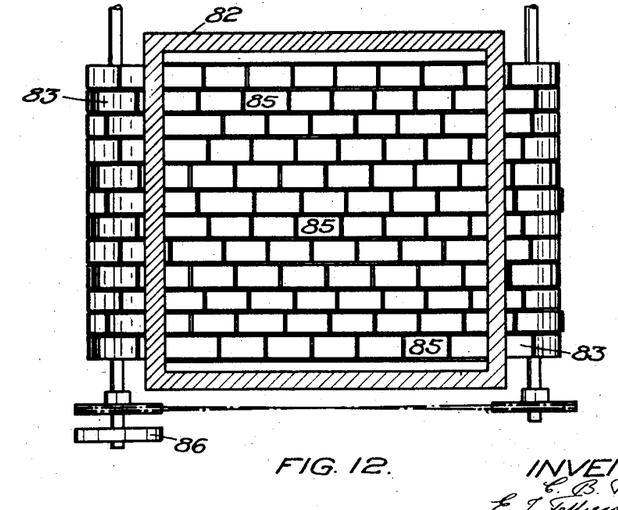
Figure 12 is a plan view of the mechanism illustrated in Figure 11.

In Figures 11 and 12 the discharging and proportioning mechanism operates over a hopper 81 and includes a complete flooring under the tower 82 of endless conveyers 83. These conveyers 83 have the transverse divisions 84 forming the compartments 85 and are driven alternately in opposite directions by the belt and pulley mechanism 86.

The proportioning device is supplemented at the bottom of the hopper by a rotating drum 87 discharging into a measure 88, in a somewhat similar fashion to the mechanism described in Figures 1 and 2.

Figure 13:
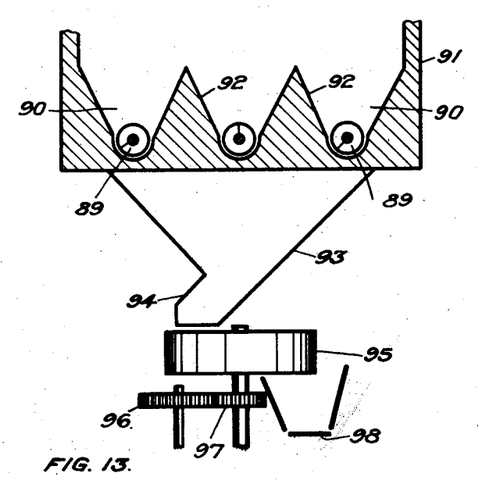
Figure 13 is a modification of the screw conveyer discharge mechanism illustrated in Figures 9 and 10.
Figure 14:
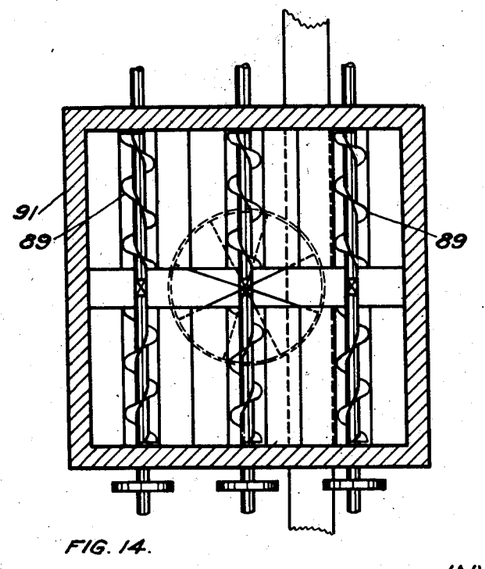
Figure 14 is a plan view of the mechanism illustrated in Figure 13.

In Figures 13 and 14 the screw discharge members 89 operate in the open troughs 90 in the bottom of the tower 91 which is here shown as rectangular.

The trough walls 92 are of upwardly tapered shape in cross section and the opposing walls of the tower are inclined at their lower ends to correspond to these tapered walls of the troughs, so as to cooperate therewith in directing the slowly flowing material on to the screw discharge members which are journalled in the wall of the tower.

The rotation of these screw discharge members directs the material into the hopper 93 from which it flows into the chute 94 directed to the discharge drum 95 rotated by the gears 96 and 97 and emptying into the conveyer 98.

Figure 15:
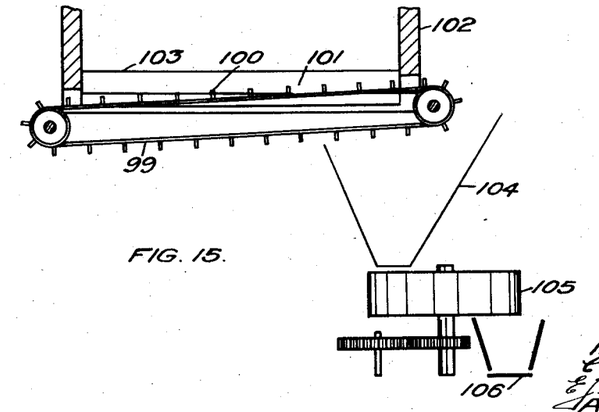
Figure 15 is a modification of the conveyer measuring device of the endless conveyer measuring device illustrated in Figures 3, 4 and 5.
Figure 16:
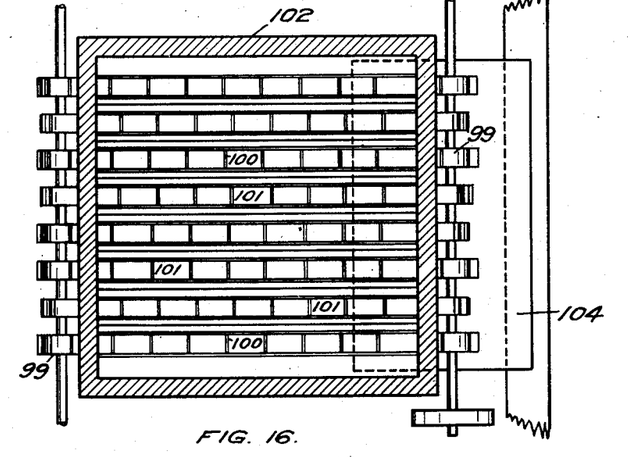
Figure 16 is a plan view of the mechanism illustrated in Figure 15.
Figure 17:
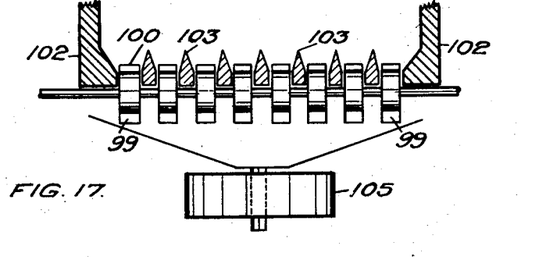
Figure 17 is a cross sectional view of the receptacle showing the conveyers and guides.
Figures 18, 19, 21:
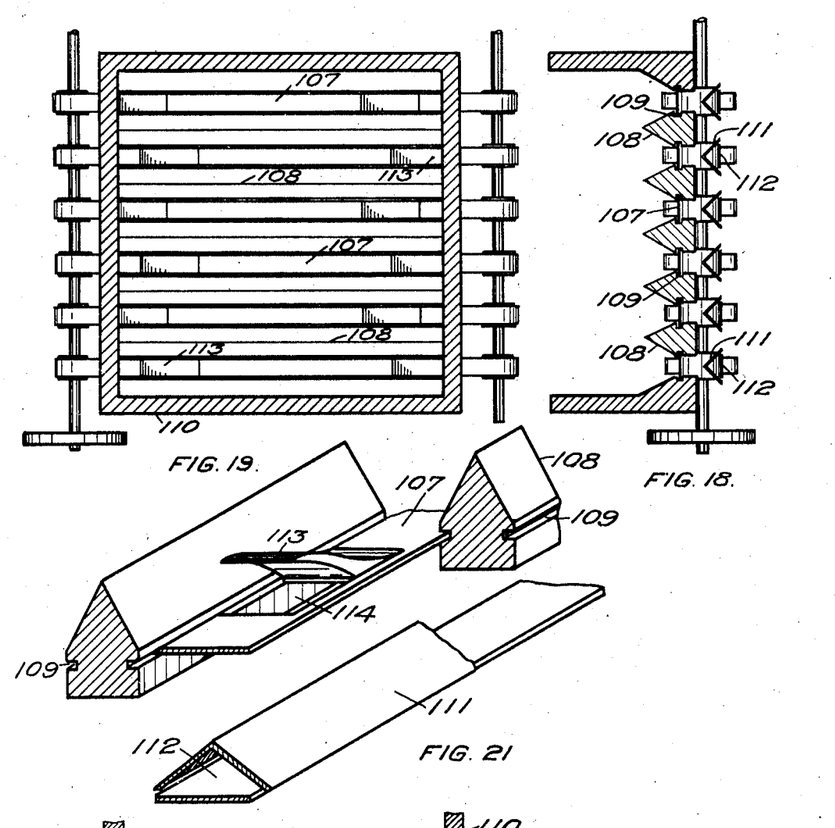
Figure 18 is a fragmentary sectional view of the tower showing still another modification of the endless conveyer discharge device.
Figure 19 is a plan view of the mechanism illustrated in Figure 18.
Figure 21 is an enlarged fragmentary detail showing the conveyer measuring scoup and the shields and guides.
Figure 20:
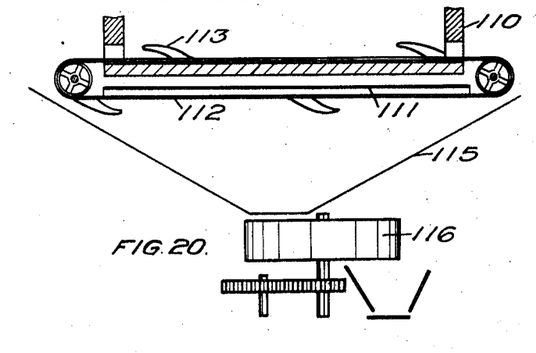
Figure 20 is a cross sectional view of the proportioning discharge device illustrated in Figures 18 and 19.

In Figures 15, 16 and 17 a plurality of endless conveyers 99 having divisions 100 forming compartments 101 again form the flooring of a rectangular tower 102, though in this instance these conveyers 99 are separated by the pointed rails 103, which project upwardly between these conveyers and direct the slowly moving material into the compartments 101, furthermore these conveyers 99 are inclined and driven in an upwardly moving direction and empty into the hopper 104, which deposits the material in the rotating drum 105, which discharges into the conveyer 106 or other receptacle.

In Figures 18, 19, 20 and 21 the conveyers 107 extend into the dividing and pointed rails 108 in the longitudinal slots 109 and therewith form the flooring of the tower 110.

The shields 111 form deflecting members for the material to flow on either side of the inner surface 112 of the conveyer belt while from the outer surface of this conveyer belt the scoups 113 extend forwardly over the discharge openings 114 in the belt, and each measure of the discharge so guided drops through into the hopper 115 and from there into the discharge rotating drum 116 and into the conveyer 117.

In summing up this invention and the various means of carrying out the method, it may be mentioned that in each mechanism the charging of a tower of any desired shape is the first essential in moving towards the accomplishment of the purpose of the invention and the next step is to in some manner cause the agitation at the bottom of the receptacle so as to promote the flow of the slowly moving material, and then it is required to divide this material into quantities whereby the amount withdrawn will be definitely known, for in one tower a certain material may be stored, which constitutes, say a half dozen measures of the proposed mixture, while in another tower one dozen measures of the proposed mixture may be used, and yet only a single measure in still another tower, while the greatest quantity of the mixture may be withdrawn from the fourth tower, and that may be a hundred measures or more.

So it will readily be seen that it is not desirable to confine the invention to any particular means of measuring so long as that means is efficient and quick in its movement, because where a mill is known to have a great capacity, as far as output is concerned, it is extremely necessary to economize in so far as time and labor is concerned, in adding the ingredients of raw or manufactured materials in the proper proportions, and to do this from storage towers, bins, tanks or other receptacles in the regular way of discharging, is certainly the most acceptable method for manufacturers which can be carried out with exactitude, not possible otherwise with such materials.

It will be noticed that in every instance, the discharging and measuring mechanism is a form of conveyer, which discharges and measures at the same time, thus obtaining the proportions of materials quickly, as for example in the first means described, the rotor with measuring compartments delivers the material to the screw conveyer which in turn delivers it to an endless conveyer.

In the next means, endless conveyers are applied directly to the discharge.

In the next means, another form of rotor conveys the materials through the discharge openings and in the next means, the screw conveyer is again brought directly in as a discharge member.

The endless conveyers are brought into use in several of the means described in the modified forms and also screw conveyer so it is really always a case of conveying and measuring at the same time, which produces the continuous method to bring forth the desired result.

What I claim is:—

1. In means for storing, measuring and proportioning semi-fluent materials, a rotor having adjustable radial divisions for determining different measures, a casing for said rotor having an adjustable wall section operable in conformance with said adjustable divisions and means for rotating said rotor.

2. In means for storing, measuring and proportioning semi-fluent materials, a tower forming the storage receptacle and having a discharge opening and the floor inclined downwardly to said opening, means for continuously sweeping the floor in the direction of the opening during discharging operations and for maintaining the top level of the contents, a vertical shaft carrying said means and suitably driven and extending upwardly and centrally through said bottom, a base frame secured to the tower at said discharge opening and forming a shaft support, a discharge pocket secured to said base frame, and a rotary measure operating in said pocket and discharging the material in predetermined quantities through an outlet therefrom.

3. In means for storing, measuring and proportioning semi-fluent materials, a tower forming the storage receptacle and having a discharge opening at the bottom thereof, a vertical shaft suitably driven and extending upwardly and centrally through said bottom, a base frame secured to the tower at said discharge opening and forming a shaft support, a discharge pocket having telescopically arranged walls adjustable to a measure and an adjustable rotary measure, operating in said pocket and discharging the material in predetermined quantities through an outlet therefrom.

4. In means for storing, measuring and proportioning semi-fluent materials, a tower forming the storage receptacle and having a discharge opening at the bottom thereof, a vertical shaft suitably driven and extending upwardly and centrally through said bottom, a base frame secured to the tower at said discharge opening and forming a shaft support, a discharge pocket adjustable to different sizes and having a shielded discharge and a rotary measure having adjustable radial divisions forming compartments and passing under said shield and discharging the material in predetermined quantities through an outlet therefrom.

5. In means for storing, measuring and proportioning semi-fluent materials, a tower forming the storage receptacle and having a discharge opening at the bottom thereof, a vertical shaft suitably driven and extending upwardly and centrally through said bottom, a base frame secured to the tower at said discharge opening and forming a shaft support, a rotary measure including a sleeve supported and rotatable on said shaft, a collar sliding on said sleeve and vertically adjustable thereon, divisions radially projecting from said sleeve and said collar and forming adjustable measure walls and a pocket containing said measure and having a shield over emptying measures.

Signed at Montreal, Canada, this 22d day of October 1929.

CARL BUSCH THORNE.